No. 816,884. PATENTED APR. 3, 1906.
C. S. SCOTT.
DETACHABLE PNEUMATIC TIRE.
APPLICATION FILED MAR. 23, 1905. RENEWED MAR. 5, 1906.
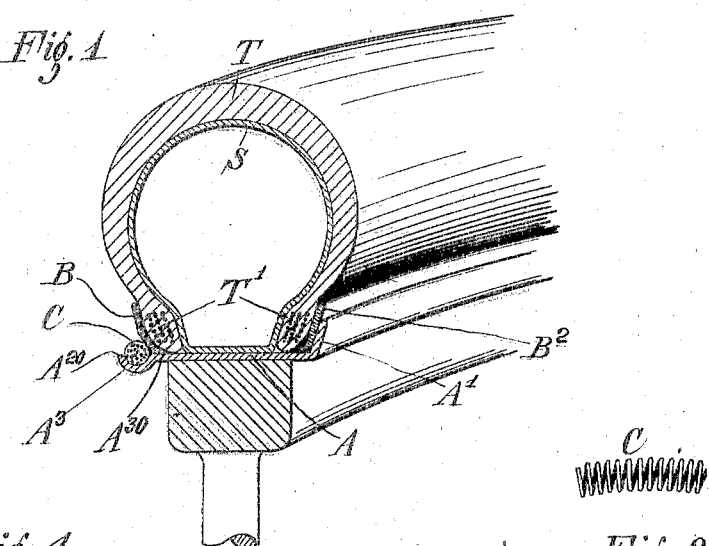
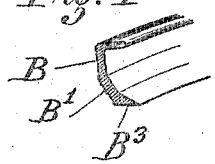
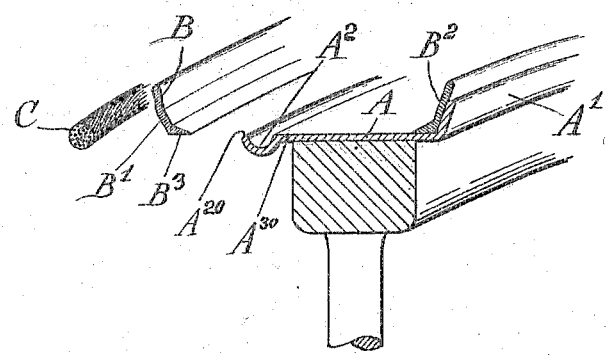
Witnesses:
Inventor:
Charles S. Scott
By his Attorneys,
Lyons Bising.

UNITED STATES PATENT OFFICE.

CHARLES S. SCOTT, OF CADIZ, OHIO, ASSIGNOR, BY MESNE ASSIGNMENTS, TO THE GOODYEAR TIRE AND RUBBER COMPANY.

DETACHABLE PNEUMATIC TIRE.

No. 816,884.    Specification of Letters Patent.    Patented April 3, 1906.

Application filed March 23, 1905. Renewed March 5, 1906. Serial No. 304,264.

*To all whom it may concern:*

Be it known that I, CHARLES S. SCOTT, a citizen of the United States, and a resident of Cadiz, Harrison county, Ohio, have invented a new and useful Improvement in Detachable Pneumatic Tires, of which the following is a specification.

My invention relates to a rim construction for pneumatic tires for heavy vehicles, whether these be of the so-called "clencher" or "inextensible-selvage" type, by which the tire may be readily removed when deflated, and, on the other hand, the parts of the rim when assembled are automatically seated, locked into, and held in position by the inflation of the tire.

Broadly stated, my invention consists of a wheel-rim, the outer face of which carries a depressed groove near the detaching edge. The rim-flange which coöperates therewith is a separate and removable inextensible annulus, made inextensible, for instance, by rolling a strip of metal into annular form and welding the ends together or in any other way which will not permit it to stretch sufficiently to pass over the locking-ring to be hereinafter referred to. The inner circle of this removable rim-flange is of a diameter to readily pass over the outer circular edge of the depressed groove and to find a seat on or against the rim. To hold the rim-flange in place on the rim, I use a contractible locking-ring. The construction of the parts is such that this ring is also capable of being readily slipped over the outer circular edge of the depressed groove, whereupon it is sprung, and thus contracted, into the groove, the portion of the locking-ring which extends above the groove acting as an abutment against which the outer side face of the rim-flange is forced by the inflation of the tire.

More specifically stated, my invention consists of an annular detachable inextensible rim-flange having an inclined face and a seat on the rim, a wheel-rim having a groove near one edge of its upper face, and a contractible locking-ring fitted in the groove, the inclined face on the rim-flange automatically coöperating with the locking-ring to exert a radially-contracting pressure upon it, and thereby hold it in the groove upon inflation of the tire. This locking-ring may consist of a wire rope or of a split ring of wire or metal and, in fact, an endless wire helix may be employed with considerable advantage. As the rim-flange is of a shape which can readily be rolled and as the rim itself is of a construction which lends itself to easy manufacture, it follows that by my invention I attain simply and cheaply a pneumatic tire for heavy vehicles, which is capable of most rapid detachment and which can be put into place and automatically held there by the inflation of the tire without further manipulation.

In the drawings, Figure 1 is a perspective of a portion of rim and tire embodying my invention, the end being shown in section and the tire inflated. Fig. 2 is a similar view with the tire removed. Fig. 3 is a detail of a modified form of locking-ring, and Fig. 4 is a detail of a clencher form of rim-flange.

The pneumatic tire, consisting of an inner tube S and an outer shoe T, having selvages T', needs no further description. It suffices to say that I may use either an inextensible form of selvage, in which case my rim-flange will curve outwardly, as shown in Fig. 1, or I may use a hook form of selvage, in which case the rim-flanges will turn inwardly, as shown in Fig. 4.

The wheel-rim A has a side flange A' on one edge and a groove $A^2$ depressed into its upper face near the other edge. The annular inextensible rim-flange $B^2$ is held from lateral displacement by the flange A' in a manner which will be readily understood. In fact, nothing prevents me permanently uniting the flanges $B^2$ and A' or rolling these parts in one piece. The rim-flange B, having its seat $B^3$ on the rim, however, when the parts are in position is kept from lateral removal from the rim by the locking-ring C, which fits in the groove $A^2$, preferably rolled into the rim A. The groove $A^2$ is near the so-called "detaching" edge of the rim. I note that since the rim-flange is inextensible, being preferably composed of a solid metal annulus, it must have an inner diameter—I mean the diameter of the circle $B^3$—which will permit its ready passage over the outer circular edge $A^{20}$ of the groove $A^2$. From a commercial standpoint this means that the diameter of the circle $B^3$ must be a trifle larger than the diameter of the outer edge $A^{20}$. It must also be understood that the construction of the parts is such that the contractible locking-ring is capable of a ready passage over the outer edge $A^{20}$ of the groove $A^2$, so that it may in this way be sprung, and thus contracted into the groove. It is in this sense that the locking-ring is contractible. The portion of the locking-ring which extends above the groove acts as an abutment against which the outer face of the rim-flange is forced by the inflation of the tire. I preferably make the outer surface $A^{30}$ of the rim near the groove $A^2$ of cylindrical shape for the purpose of additionally securing a firm seat for the inner circle $B^3$ of the rim-flange thereupon, which circle is made of a size to fit the circle $A^{30}$.

Coming to a more specific description of the wheel-rim shown in the drawings and the parts being assumed to loosely occupy the positions shown in Fig. 1 with the tire deflated, it is apparent that by virtue of the inclined face B' and the seat $B^3$ the tire-inflation will of its own accord and without any manual assistance automatically seat the flange B against the locking-ring C and that the lateral outward pressure exerted by the rim B will cause a radially inward or contracting pressure upon the ring C to automatically additionally contract it, and thus lock it into place. This feature, by virtue of which the rim-flange automatically seats itself upon the locking-ring and thereafter exerts a radial contracting pressure thereupon, is another important feature of my invention. It is equally plain that in order to remove the tire upon deflation it is necessary to force the flange B inward toward the flange A', thus freeing the locking-ring C, which can then be sprung straight up out of the groove $A^3$ and across the edge $A^{20}$. Thereupon the flange B slides outwardly over the edge $A^{20}$, and the selvage T' of the tire-shoe follows.

The locking-ring C may be made of an endless piece of wire rope which has sufficient extensibility to be readily sprung, and thus contracted into the groove $A^2$. The contracting pressure of the ring B will cause the fibers of the rope to shorten sufficiently to prevent the ring from jumping out of the groove. Instead of a ring of rope I may use a split ring. This may be curved in cross-section and of a shape suitable for coöperating with the inclined face B'. The curved cross-section of the locking-ring is automatically adapted, as it were, to coöperate with the inclined face on the rim-flange. A peculiarly useful form of locking-ring is drawn in Fig. 3. It consists of a helix of wire having its ends joined in ring form.

In order that the tire-shoe may readily slip off and on the wheel-rim, its selvages should embrace the rim loosely. Inflation of the tire would thus leave the selvages without a uniform seat against the rim. The wedge-shaped foot $B^3$ provides a seat which adjusts itself to varying degrees of looseness of the selvage and produces a peculiar tight or antichafing fit of the parts.

It should perhaps be mentioned that the face B', which contacts with the ring C, is inclined with reference to the rim-surface and not necessarily with reference to the adjacent outer faces of the rim-flange B.

I claim—

1. The combination of a vehicle-wheel rim having a depressed groove near its detaching edge, an annular, inextensible, detachable, rim-flange, having an inner diameter which permits its ready passage over the outer edge of the groove, and a contractible locking-ring which is passed over the outer edge of the groove and sprung into the groove to form an abutment for the rim-flange, substantially as described.

2. The combination of a vehicle-wheel rim having a depressed groove near its detaching edge, an annular, inextensible, detachable rim-flange having an inner diameter which permits its ready passage over the outer edge of the groove, a contractible locking-ring which is passed over the outer edge of the groove and sprung into the groove to form an abutment for the rim-flange, and a pneumatic tire, the inflation of which forces the rim-flange against the abutment, substantially as described.

3. The combination of a vehicle-wheel rim having a depressed groove at or near the detaching edge, an annular, inextensible rim-flange having an inner diameter greater than the diameter of the outer edge of the groove, and a contractible locking-ring which is passed over the outer edge of the groove and sprung into the groove to form an abutment for the rim-flange, substantially as described.

4. The combination of a vehicle-wheel rim having a depressed groove at or near the detaching edge, an annular, inextensible rim-flange having an inner diameter greater than the diameter of the outer edge of the groove, a contractible locking-ring which is passed over the outer edge of the groove and sprung into the groove to form an abutment for the rim-flange, and a pneumatic tire forcing the rim-flange against the abutment on inflation, substantially as described.

5. The combination of a vehicle-wheel rim which is cylindrical near its detaching edge, a groove depressed therein, at or near the detaching edge, an annular inextensible rim-flange having an inner diameter greater than the diameter of the outer edge of the groove, but of a size to fit the cylindrical rim-surface, and a contractible locking-ring which is passed over the outer edge of the groove and sprung into the groove to form an abutment for the rim-flange, substantially as described.

6. The combination of a vehicle-wheel rim which is cylindrical near its detaching edge, a groove depressed therein at or near the detaching edge, an annular, inextensible rim-flange having an inner diameter greater than the diameter of the outer edge of the groove but of a size to fit the cylindrical rim-surface, a contractible locking-ring which is passed over the outer edge of the groove and sprung into the groove to form an abutment for the rim-flange, and a pneumatic tire forcing the rim-flange against the abutment on inflation, substantially as described.

7. A vehicle-wheel rim having a groove at one edge, a detachable, inextensible rim-flange, having a seat on the rim, and a locking-ring contracted into the groove by lateral outward movement of the rim-flange, substantially as described.

8. A vehicle-wheel rim having a groove at one edge, a detachable, inextensible rim-flange, having an inclined face and a seat on the rim, and a locking-ring fitting in the groove and coöperating with the inclined face on the rim-flange whereby lateral outward movement of the rim-flange causes a contraction of the locking-ring, substantially as described.

9. A vehicle-wheel rim having a groove at one edge, a detachable, inextensible rim-flange, having an inclined face, and a locking-ring which is curved in cross-section fitting in the groove and coöperating with the inclined face, substantially as described.

10. A vehicle-wheel rim having a groove at one edge, a detachable, inextensible rim-flange having an annular wedge-shaped foot, and a locking-ring fitting in the groove, substantially as described.

11. A cylindrical vehicle-wheel rim having a side flange at one edge and a depressed groove at the other edge, an annular, inextensible rim-flange coöperating with the side flange, and an annular, inextensible rim-flange having an inner diameter greater than the diameter of the outer edge of the groove and fitting the cylindrical rim portion and a contractible locking-ring sprung into the groove over its outer edge, substantially as described.

12. The combination of a vehicle-wheel rim having a depressed groove at one edge thereof, an annular detachable rim-flange having an inner diameter greater than the diameter of the edges of the groove, thereby permitting of the mounting of the flange upon the rim, and a locking-ring which is passed over one edge of the rim and sprung into the groove and constitutes an abutment for the rim-flange, thereby retaining it in operative position, substantially as described.

13. The combination of an imperforate vehicle-wheel rim having one side provided with a depressed groove, an annular rim-flange separate from the tire and having an inner diameter which permits its passage over one edge of the rim, and a locking-ring which is passed over the outer edge of the rim and sprung into the groove to form an abutment for the separate flange, thereby retaining it in operative position, substantially as described.

14. A vehicle-wheel comprising a rim having a groove, an endless tire-holding device separate from the tire and mounted thereon, and a locking device adapted to be sprung over the edge of the rim and mounted in the groove and engaging said holding device for securing the latter in position, substantially as described.

In testimony whereof I have signed my name to this specification in the presence of two subscribing witnesses.

CHAS. S. SCOTT.

Witnesses:
D. A. HALLINGSWORTH,
R. C. PETTIS.